(12) United States Patent
Otani et al.

(10) Patent No.: US 12,123,175 B2
(45) Date of Patent: Oct. 22, 2024

(54) REMOTE OPERATION DEVICE, REMOTE OPERATION ASSISTANCE SERVER, REMOTE OPERATION ASSISTANCE SYSTEM, AND REMOTE OPERATION ASSISTANCE METHOD

(71) Applicant: KOBELCO CONSTRUCTION MACHINERY CO., LTD., Hiroshima (JP)

(72) Inventors: Masaki Otani, Hiroshima (JP); Yusuke Fujiwara, Hiroshima (JP); Seiji Saiki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 217 days.

(21) Appl. No.: 17/794,089

(22) PCT Filed: Jan. 7, 2021

(86) PCT No.: PCT/JP2021/000337
§ 371 (c)(1),
(2) Date: Jul. 20, 2022

(87) PCT Pub. No.: WO2021/166475
PCT Pub. Date: Aug. 26, 2021

(65) Prior Publication Data
US 2023/0056724 A1 Feb. 23, 2023

(30) Foreign Application Priority Data
Feb. 18, 2020 (JP) .................. 2020-025720

(51) Int. Cl.
E02F 9/26 (2006.01)
E02F 9/20 (2006.01)
(Continued)

(52) U.S. Cl.
CPC .............. *E02F 9/261* (2013.01); *G06F 3/013* (2013.01); *G06F 3/1423* (2013.01); *H04N 7/183* (2013.01); *E02F 9/205* (2013.01); *G08C 17/02* (2013.01)

(58) Field of Classification Search
CPC ... E02F 9/261; E02F 9/205; E02F 3/32; E02F 9/26; G06F 3/013; G06F 3/1423; H04N 7/183; H04N 7/185; G08C 17/02
(Continued)

(56) References Cited

U.S. PATENT DOCUMENTS 10,233,615 B2   3/2019   Yamaguchi et al.
11,136,745 B2   10/2021  Yamada et al.
(Continued)

FOREIGN PATENT DOCUMENTS

CA      3 065 190 A1    4/2019
JP      2018-207244 A   12/2018
(Continued)

OTHER PUBLICATIONS

Extended European search report dated May 15, 2023 issued in the corresponding EP Patent Application No. 21757735.2.

*Primary Examiner* — Tyler D Paige
(74) *Attorney, Agent, or Firm* — Carrier, Shende & Associates P.C.; Joseph P. Carrier; Jeffrey T. Gedeon (57) ABSTRACT

A display mode of a picked-up image in a central image output device 2210 (specified image output device) is variably controlled so as to display all of respective specified portions PPL and PPR of a pair of pillars 4240L and 4240R configuring a cab 424 in the central image output device 2210 (specified image output device). The specified portions PPL and PPR are part of the pillars 4240L and 4240R overlapping a specified image region R that extends in a belt shape between left and right bezels 2210L and 2210R.

12 Claims, 9 Drawing Sheets (51) Int. Cl.
  *G06F 3/01*   (2006.01)
  *G06F 3/14*   (2006.01)
  *G08C 17/02*  (2006.01)
  *H04N 7/18*   (2006.01)
(58) Field of Classification Search
  USPC .......................................................... 701/2
  See application file for complete search history.

(56) References Cited

U.S. PATENT DOCUMENTS

| | | | | |
|---|---|---|---|---|
| 2017/0284069 | A1* | 10/2017 | Machida | E02F 9/261 |
| 2018/0044893 | A1* | 2/2018 | Machida | H04N 23/90 |
| 2019/0302453 | A1* | 10/2019 | Oshima | G03B 21/00 |
| 2020/0063397 | A1* | 2/2020 | Hatake | E02F 9/2004 |
| 2020/0240110 | A1* | 7/2020 | Takahama | E02F 9/205 |
| 2020/0399861 | A1 | 12/2020 | Ito et al. | |
| 2021/0025131 | A1* | 1/2021 | Sasaki | E02F 9/261 |
| 2023/0056724 | A1* | 2/2023 | Otani | G06F 3/1423 |

FOREIGN PATENT DOCUMENTS

| | | |
|---|---|---|
| JP | 2019-007139 A | 1/2019 |
| JP | 2019-167733 A | 10/2019 |
| WO | 2016/013691 A1 | 1/2016 |
| WO | 2019/003431 A1 | 1/2019 |

* cited by examiner

REMOTE OPERATION DEVICE, REMOTE OPERATION ASSISTANCE SERVER, REMOTE OPERATION ASSISTANCE SYSTEM, AND REMOTE OPERATION ASSISTANCE METHOD

TECHNICAL FIELD

The present invention relates to a remote operation assistance server for assisting work using a work machine by a worker by communication with a client allocated to the worker of the work machine.

BACKGROUND ART

A technology of making an image output device arranged so as to be adjacent at a side edge configuring a remote operation device display a picked-up image indicating a situation of a work site picked up by a real machine image pickup device installed on a work machine has been proposed (for example, see Patent Literature 1).

CITATION LIST

Patent Literature

Patent Literature 1: Japanese Patent Laid-Open No. 2018-207244

SUMMARY OF INVENTION

Technical Problem

However, when a real machine image pickup device is arranged inside an operator's cab, it is possible that a pair of left and right pillars present on a front side of the operator's cab are projected in a picked-up image displayed at an image output device configuring a remote operation device and left and right bezels of the image output device and the pair of pillars are mistaken and mixed up by an operator.

Accordingly, an object of the present invention is to provide a remote operation device or the like capable of reducing the possibility of an operator mistaking or mixing up a pair of pillars of an operator's cab projected in a picked-up image and bezels of an image output device where the pillars are displayed.

Solution to Problem

A remote operation device of the present invention comprises:
  a remote operation mechanism operated by an operator in order to remotely operate a work machine;
  one or more image output devices arranged around the remote operation mechanism; and
  a remote controller, and
  the remote controller makes a specified image output device of the one or more image output devices display a picked-up image indicating a situation in front of an operator's cab of the work machine, which is acquired by a real machine image pickup device installed inside the operator's cab, and variably controls a display mode of the picked-up image in the specified image output device so as to display all of a specified portion, which is part of at least one of a pair of pillars configuring the operator's cab, overlapping a specified image region that extends in a belt shape between left and right bezels in the specified image output device.

According to the remote operation device of the configuration, the picked-up image indicating the situation in front of the operator's cab, which is acquired by the real machine image pickup device installed inside the operator's cab of the work machine is displayed in the specified image output device. Therefore, the operator can operate the remote operation mechanism while recognizing the situation in front of the operator's cab of the work machine or a real machine which is a remote operation target, through the picked-up image displayed in the specified image output device. The "operator's cab" means a space where the operator gets in to not remotely but directly operate the work machine and also means a space corresponding to the space even if the operator does not actually get in.

Further, the display mode of the picked-up image in the specified image output device is variably controlled so as to display all of a specified portion, which is part of at least one pillar configuring the operator's cab, overlapping a specified image region that extends in a belt shape between left and right bezels in the specified image output device. Thus, it becomes possible to clearly identify the left and right bezels in the specified image output device and part of the at least one pillar at least in the specified image region that extends laterally between the left and right bezels. Accordingly, a possibility of the operator mistaking or mixing up the pair of the pillars of the operator's cab projected in the picked-up image and the bezels of the image output device where the pillars are displayed is reduced.

DESCRIPTION OF EMBODIMENTS (Configuration of Remote Operation Assistance System)

Figure 1:
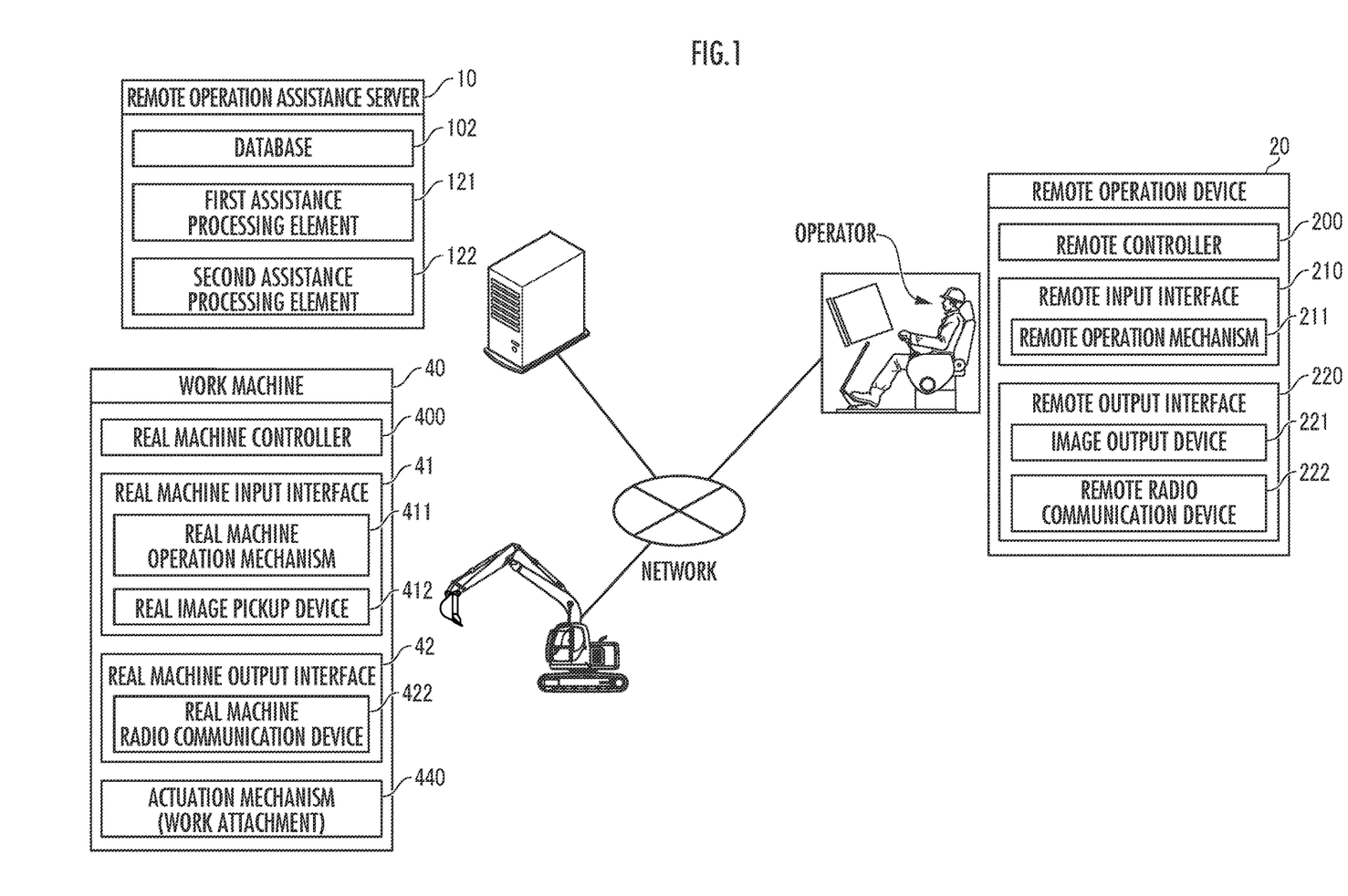
FIG. 1 is an explanatory drawing regarding a configuration of a remote operation assistance system as one embodiment of the present invention.

The remote operation assistance system as one embodiment of the present invention illustrated in FIG. 1 is configured by a remote operation assistance server 10, and a remote operation device 20 for remotely operating a work machine 40. The remote operation assistance server 10, the remote operation device 20 and the work machine 40 are configured such that network communication with each other is possible. An intercommunication network of the remote operation assistance server 10 and the remote operation device 20 and an intercommunication network of the remote operation assistance server 10 and the work machine 40 may be the same or may be different (Configuration of Remote Operation Assistance Server)

The remote operation assistance server 10 comprises a database 102, a first assistance processing element 121 and a second assistance processing element 122. The database 102 stores and holds picked-up image data or the like. The database 102 may be configured by a database server different from the remote operation assistance server 10. The individual assistance processing element is configured by an arithmetic processing unit (a single-core processor, a multi-core processor or a processor core configuring it), reads required data and software from a storage device such as a memory, and executes arithmetic processing to be described later according to the software with the data as a target.

(Configuration of Remote Operation Device)

The remote operation device 20 comprises a remote controller 200, a remote input interface 210 and a remote output interface 220. The remote controller 200 is configured by an arithmetic processing unit (a single-core processor, a multi-core processor or a processor core configuring it), reads required data and software from a storage device such as a memory, and executes arithmetic processing according to the software with the data as a target. The remote input interface 210 comprises a remote operation mechanism 211. The remote output interface 220 comprises an image output device 221 and a remote radio communication device 222.

The remote operation mechanism 211 includes a traveling operation device, a turning operation device, a boom operation device, an arm operation device and a bucket operation device. Each operation device comprises an operation lever which receives a rotating operation. The operation lever (traveling lever) of the traveling operation device is operated so as to move a lower traveling body 410 of the work machine 40. The traveling lever may also serve as a traveling pedal. For example, the traveling pedal fixed to a base part or a lower end part of the traveling lever may be provided. The operation lever (turning lever) of the turning operation device is operated so as to move a hydraulic type turning motor configuring a turning mechanism 430 of the work machine 40. The operation lever (boom lever) of the boom operation device is operated so as to move a boom cylinder 442 of the work machine 40. The operation lever (arm lever) of the arm operation device is operated so as to move an arm cylinder 444 of the work machine 40. The operation lever (bucket lever) of the bucket operation device is operated so as to move a bucket cylinder 446 of the work machine 40.

Figure 2:
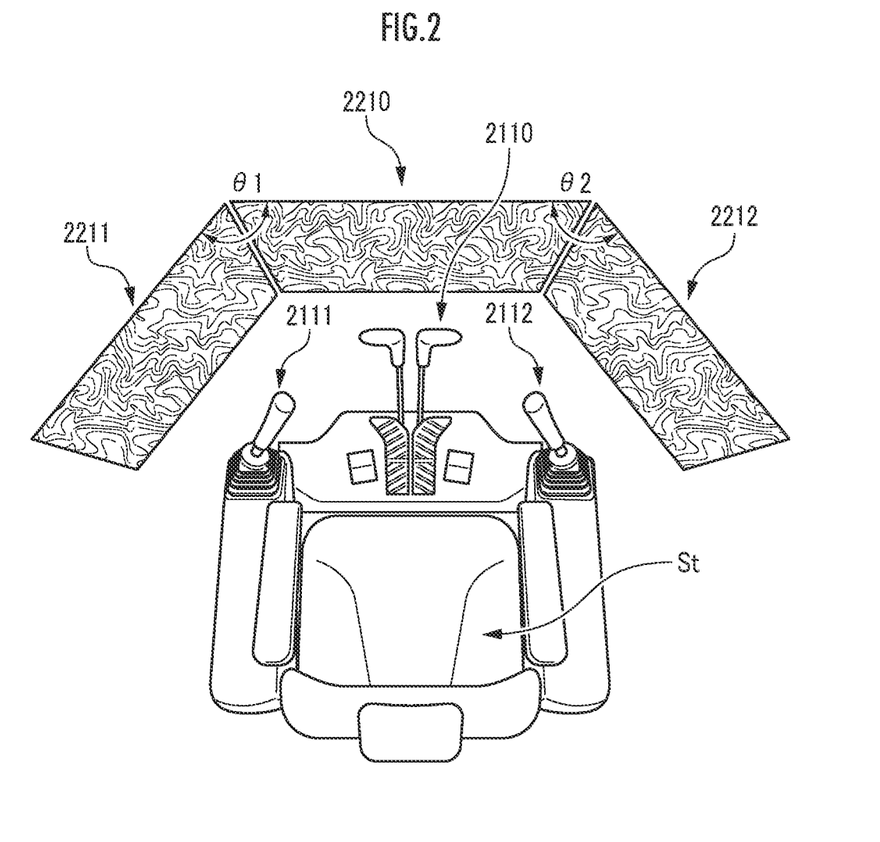
FIG. 2 is an explanatory drawing regarding a configuration of a remote operation device.

Each operation lever configuring the remote operation mechanism 211 is, for example, as illustrated in FIG. 2, arranged around a seat St for an operator to sit. The seat St is in a form like a high back chair with armrests but may be a sitting part in an optional form that the operator can sit, such as a form like a low back chair without a headrest or a form like a chair without a backrest.

A pair of left and right traveling levers 2110 according to left and right crawlers are arranged laterally side by side at a front of the seat St. One operation lever may serve as a plurality of operation levers. For example, a left side operation lever 2111 provided on the front of a left side frame of the seat St illustrated in FIG. 2 may function as the arm lever when operated in front and back directions and may function as the turning lever when operated in left and right directions. Similarly, a right side operation lever 2112 provided on the front of a right side frame of the seat St illustrated in FIG. 2 may function as the boom lever when operated in the front and back directions and may function as the bucket lever when operated in the left and right directions. A lever pattern may be arbitrarily changed by an operation instruction of the operator.

The image output device 221 is configured by a central image output device 2210, a left side image output device 2211 and a right side image output device 2212 arranged respectively at the front, diagonally left front and diagonally right front of the seat St as illustrated in FIG. 2 for example. Shapes and sizes of respective screens (image display areas) of the central image output device 2210, the left side image output device 2211 and the right side image output device 2212 may be the same or may be different.

As illustrated in FIG. 2, a right edge of the left side image output device 2211 is adjacent to a left edge of the central image output device 2210 so that the screen of the central image output device 2210 and the screen of the left side image output device 2211 form an inclination angle θ1 (for example, 120°≤θ1≤150°). As illustrated in FIG. 2, a left edge of the right side image output device 2212 is adjacent to a right edge of the central image output device 2210 so that the screen of the central image output device 2210 and the screen of the right side image output device 2212 form an inclination angle θ2 (for example, 120°≤θ2≤150°). The inclination angles θ1 and θ2 may be the same or may be different.

The respective screens of the central image output device 2210, the left side image output device 2211 and the right side image output device 2212 may be parallel to a vertical direction or may be inclined to the vertical direction. At least one image output device of the central image output device 2210, the left side image output device 2211 and the right side image output device 2212 may be configured by a plurality of divided image output devices. For example, the central image output device 2210 may be configured by a pair of vertically adjacent image output devices having screens roughly in a rectangular shape. The image output devices 2210-2212 may further comprise a speaker (voice output device).

(Configuration of Work Machine)

The work machine 40 comprises a real machine controller 400, a real machine input interface 41, a real machine output interface 42 and an actuation mechanism 440. The real machine controller 400 is configured by an arithmetic processing unit (a single-core processor, a multi-core processor or a processor core configuring it), reads required data and software from a storage device such as a memory and executes arithmetic processing according to the software with the data as a target.

The work machine 40 is a crawler shovel (construction machine) for example, and comprises, as illustrated in FIG. 2, the crawler type lower traveling body 410 and an upper turning body 420 installed on the lower traveling body 410 so as to be turned through the turning mechanism 430. A cab 424 (operator's cab) is provided on a front left side part of the upper turning body 420. A work attachment 440 is provided on a front center part of the upper turning body 420.

The real machine input interface 41 comprises a real machine operation mechanism 411 and a real machine image pickup device 412. The real machine operation mechanism 411 comprises a plurality of operation levers arranged similarly to the remote operation mechanism 211 around a seat arranged inside the cab 424. A driving mechanism or a robot which receives a signal according to an operation mode of a remote operation lever and moves a real machine operation lever based on the received signal is provided in the cab 424. The real machine image pick-up device 412 is installed inside the cab 424 for example, and picks up an image of an environment including at least part of the actuation mechanism 440 over a front window and a pair of left and right side windows sectioned by a pair of left and right pillars 4240 ("L" and "R" are included in signs when distinguishing left and right) provided on a front side of the cab 424. Part or all of the front window and the side windows may be omitted.

The real machine output interface 42 comprises a real machine radio communication device 422.

The work attachment 440 as the actuation mechanism comprises a boom 441 mounted on the upper turning body 420 so as to be hoisted, an arm 443 rotatably connected to a distal end of the boom 441, and a bucket 445 rotatably connected to a distal end of the arm 443. On the work attachment 440, a boom cylinder 442, an arm cylinder 444 and a bucket cylinder 446 configured by extendable hydraulic cylinders are mounted.

The boom cylinder 442 is interposed between the boom 441 and the upper turning body 420 so as to be extended and contracted by receiving supply of the hydraulic oil and rotate the boom 441 in a hoisting direction. The arm cylinder 444 is interposed between the arm 443 and the boom 441 so as to be extended and contracted by receiving the supply of the hydraulic oil and rotate the arm 443 around a horizontal axis to the boom 441. The bucket cylinder 446 is interposed between the bucket 445 and the arm 443 so as to be extended and contracted by receiving the supply of the hydraulic oil and rotate the bucket 445 around the horizontal axis to the arm 443.

(Function)

The functions of the remote operation assistance system of the configuration will be explained using a flowchart illustrated in FIG. 4. In the flowchart, blocks indicated by the letter "C" followed by a number are used to simplify description, and the blocks indicate transmission and/or reception of data and indicate a conditional branch of executing processing in a branch direction on condition that the data is transmitted and/or received.

Figure 4:
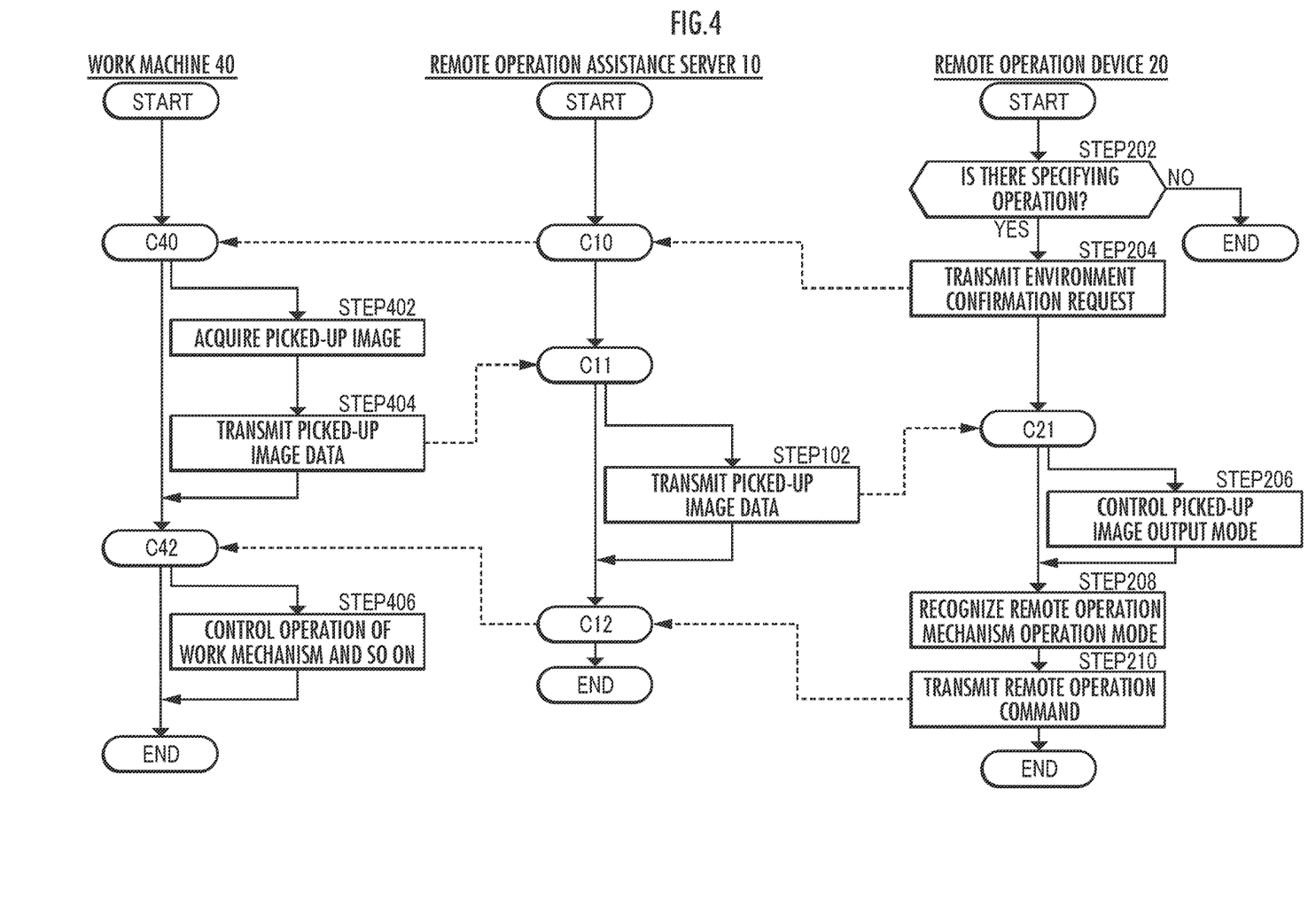
FIG. 4 is an explanatory drawing regarding a function of a remote operation assistance system.

In the remote operation device 20, presence/absence of a specifying operation through the remote input interface 210 is determined by an operator (OP) (FIG. 4/STEP 202). The "specifying operation" is an operation of tapping or the like in the remote input interface 210 for specifying the work machine 40 that the operator OP intends to remotely control in a birds-eye work environment image, for example. When the determination result is negative (FIG. 4/STEP 202 . . . NO), the processing of determining the presence/absence of the specifying operation and succeeding processing are repeated. On the other hand, when the determination result is affirmative (FIG. 4/STEP 202 . . . YES), an environment confirmation request is transmitted to the remote operation assistance server 10 through the remote radio communication device 222 (FIG. 4/STEP 204).

In the remote operation assistance server 10, when the environment confirmation request is received, the environment confirmation request is transmitted to the pertinent work machine 40 by the first assistance processing element 121 (FIG. 4/C10).

In the work machine 40, when the environment confirmation request is received through the real machine radio communication device 422 (FIG. 4/C40), the real machine controller 400 acquires the picked-up image through the real machine image pickup device 412 (FIG. 4/STEP 402). By the real machine controller 400, the picked-up image data indicating the picked-up image is transmitted to the remote operation device 20 through the real machine radio communication device 422 (FIG. 4/STEP 404).

In the remote operation assistance server 10, when the picked-up image data is received by the first assistance processing element 121 (FIG. 4/C11), the picked-up image data is transmitted to the remote operation device 20 by the second assistance processing element 122 (FIG. 4/STEP 102). Instead of the picked-up image data, environment image data indicating a simulated environment image generated based on the picked-up image may be transmitted to the remote operation device 20. At the time, a command of a divided display mode in the image output devices 2210-2212 for the picked-up image according to the picked-up image data may be transmitted to the remote operation device 20 by the second assistance processing element 122.

In the remote operation device 20, when the picked-up image data is received through the remote radio communication device 222 (FIG. 4/C21), the divided display mode in the three image output devices 2210-2212 for the picked-up image according to the picked-up image data is controlled by the remote controller 200 (FIG. 4/STEP 206).

Figure 5:
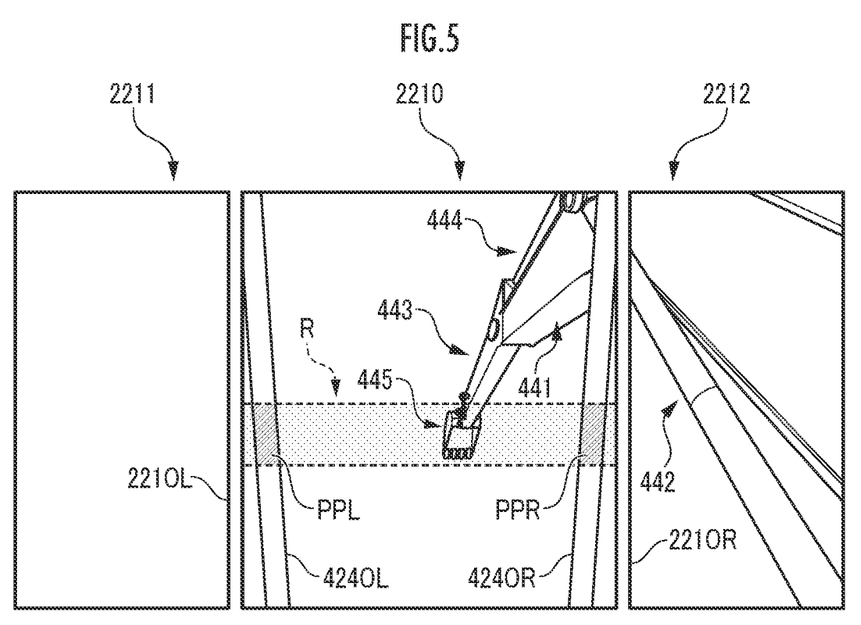
FIG. 5 is an explanatory drawing regarding a first display mode of a picked-up image.

Thus, for example, as illustrated in FIG. 5, the picked-up image in which, in addition to the left side pillar 4240L and the right side pillar 4240R configuring the cab 424, the boom 441, the arm 443 and the bucket 445 that are part of the work attachment 440 as the actuation mechanism are projected in front of the pillars 4240 is divided into three in a lateral direction, and is displayed in the central image output device 2210, the left side image output device 2211 and the right side image output device 2212 respectively. In FIG. 5, the central image output device 2210, the left side image output device 2211 and the right side image output device 2212 when facing the screen of the central image output device 2210 from a vertical direction are illustrated.

For example, as illustrated in FIG. 5, the divided display mode of the image pickup device is controlled so as to display all of a specified portion PPL of the left side pillar 4240L and a specified portion PPR of the right side pillar 4240R overlapping the specified image region R that extends in the lateral direction between a left side bezel 2210L and a right side bezel 2210R including the bucket 445 as the work unit in the central image output device 2210 as the specified image output device.

In the remote operation device 20, the operation mode of the remote operation mechanism 211 is recognized by the remote controller 200 (FIG. 4/STEP 208), and a remote operation command according to the operation mode is transmitted to the remote operation assistance server 10 through the remote radio communication device 222 (FIG. 4/STEP 210).

In the remote operation assistance server 10, when the remote operation command is received by the second assistance processing element 122, the remote operation command is transmitted to the work machine 40 by the first assistance processing element 121 (FIG. 4/C12).

In the work machine 40, when the operation command is received through the real machine radio communication device 422 by the real machine controller 400 (FIG. 4/C42), the operation of the work attachment 440 or the like is controlled (FIG. 4/STEP 406). For example, the work of scooping soil in front of the work machine 40 with the bucket 445, turning the upper turning body 420 and then dropping the soil from the bucket 445 is executed.

(Effect)

According to the remote operation assistance system of the configuration and the remote operation assistance server 10 and the remote operation device 20 configuring it, the picked-up image indicating the situation in front of the cab 424, which is acquired by the real machine image pickup device 412 installed inside the cab 424 of the work machine 40, is displayed in the central image output device 2210 (specified image output device) (FIG. 4/STEP 402→STEP 404→C11→STEP 102→C21→STEP 206, see FIG. 5). Therefore, the operator can operate the remote operation mechanism 211 while recognizing the situation in front of the cab 424 of the work machine 40 or a real machine which is a remote operation target, through the picked-up image displayed in the central image output device 2210 (specified image output device) (FIG. 4/STEP 208→STEP 210→C12→C42→STEP 406, see FIG. 5).

Further, the display mode of the picked-up image in the central image output device 2210 (specified image output device) is variably controlled so as to display all of the specified portions PPL and PPR which are part of the pair of the pillars 4240L and 4240R configuring the cab 424 respectively, overlapping the specified image region R that extends in a belt shape between the left and right bezels 2210L and 2210R in the central image output device 2210 (specified image output device) (see FIG. 5).

Thus, it becomes possible to clearly identify the left and right bezels 2210L and 2210R in the central image output device 2210 (specified image output device) and parts PPL and PPR of the pillars 4240L and 4240R at least in the specified image region R that extends laterally between the left and right bezels 2210L and 2210R. Accordingly, a possibility of the operator mistaking or mixing up the pair of the pillars of the cab 424 projected in the picked-up image with the bezels 2210L and 2210R of the central image output device 2210 where the pillars are displayed is reduced.

In particular, when a line of sight of the operator moves between the central image output device 2210 and the left side image output device 2211, the possibility of the operator mistaking or mixing up the left side bezel 2210L of the central image output device 2210 with the left side pillar 4240L configuring the cab 424 is reduced (see FIG. 5). Similarly, when the line of sight of the operator moves between the central image output device 2210 and the right side image output device 2212, the possibility of the operator mistaking or mixing up the right side bezel 2210R of the central image output device 2210 with the right side pillar 4240R configuring the cab 424 is reduced.

Further, with the specified portions PPL and PPR of the pillars 4240L and 4240R projected in the picked-up image and the bucket 445 (work unit) of the work attachment 440 (actuation mechanism) configuring the work machine 40 respectively as indexes, spatial recognition including recognition of a position, a direction, a posture, a size, a shape and an interval from a ground surface or the like which is a work object of the bucket 445 in a real space is made possible. Since the possibility of the operator mistaking or mixing up the pair of the pillars 4240L and 4240R of the cab 424 projected in the picked-up image with the bezels 2210L and 2210R of the central image output device 2210 where the pillars 4240L and 4240R are displayed is reduced as described above, spatial recognition accuracy by the operator is improved.

Other Embodiments of The Present Invention

In the embodiment described above, the central image output device 2210 arranged at the front center of the remote operation mechanism 211 is defined as the specified image output device, however, the left side image output device 2211 arranged at the diagonally left front of the remote operation mechanism 211 and/or the right side image output device 2212 arranged at the diagonally right front may be additionally or alternatively defined as the specified image output device.

In the embodiment described above, the image output device 221 is configured by the three image output devices 2210, 2211 and 2212 (or an image output device group), however, as another embodiment, the image output device 221 may be configured by one image output device (for example, the central image output device 2210) only, or may be configured by two or four or more image output devices.

In the embodiment described above, the bucket 445 is defined as the work unit, however, other components (for example, the boom 441 and/or the arm 443) of the work attachment 440 (actuation mechanism) may be additionally or alternatively defined as the work unit.

Figure 6:
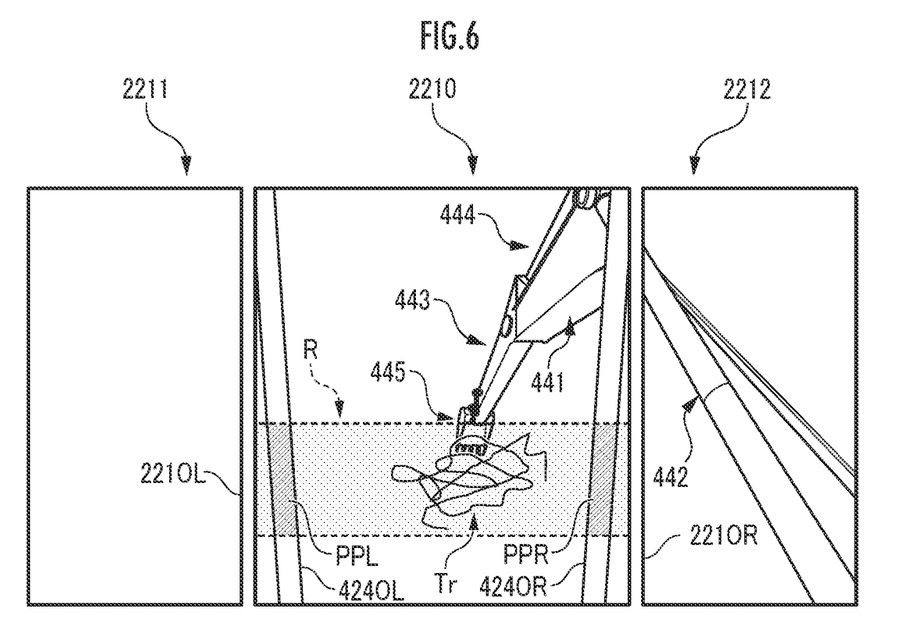
FIG. 6 is an explanatory drawing regarding a second display mode of the picked-up image.

The remote operation device 20 may further comprise a line-of-sight detector which detects a line of sight of the operator. In this case, the remote controller 200 may define an image region that extends in a belt shape in the lateral direction including part or all of a track Tr ahead on the line of sight over a second specified period (for example, 1 second to 1 minute) of the operator detected by the line-of-sight detector as the specified image region R in the central image output device 2210 (specified image output device). Then, the remote controller 200 may variably control the display mode of the picked-up image in the central image output device 2210 (specified image output device) so as to display all of the specified portion PPL or PPR of the at least one pillar 4240L or 4240R overlapping the specified image region R, as illustrated in FIG. 6.

According to the remote operation device of the configuration, with the specified portion PPL or PPR of the at least one pillar 4240L or 4240R projected in the picked-up image and an object or the like present ahead on the line of sight of the operator as indexes, the spatial recognition including the recognition of the position, the direction, the posture, the size, the shape and the interval from the work object or the like of the bucket 445 (work unit) in the real space is made possible. Since the possibility of the operator mistaking or mixing up the pair of pillars of the cab 424 projected in the picked-up image with the bezels of the image output device where the pillar is displayed is reduced as described above, the spatial recognition accuracy by the operator is improved.

The specified image region R may be defined in the other various forms. For example, the remote controller 200 may define the image region that extends in a belt shape including part or all of a position track over a first specified period (for example, 1 second to 1 minute) of the bucket 445 (work unit) as the specified image region R in the central image output device 2210 (specified image output device).

Figure 9:
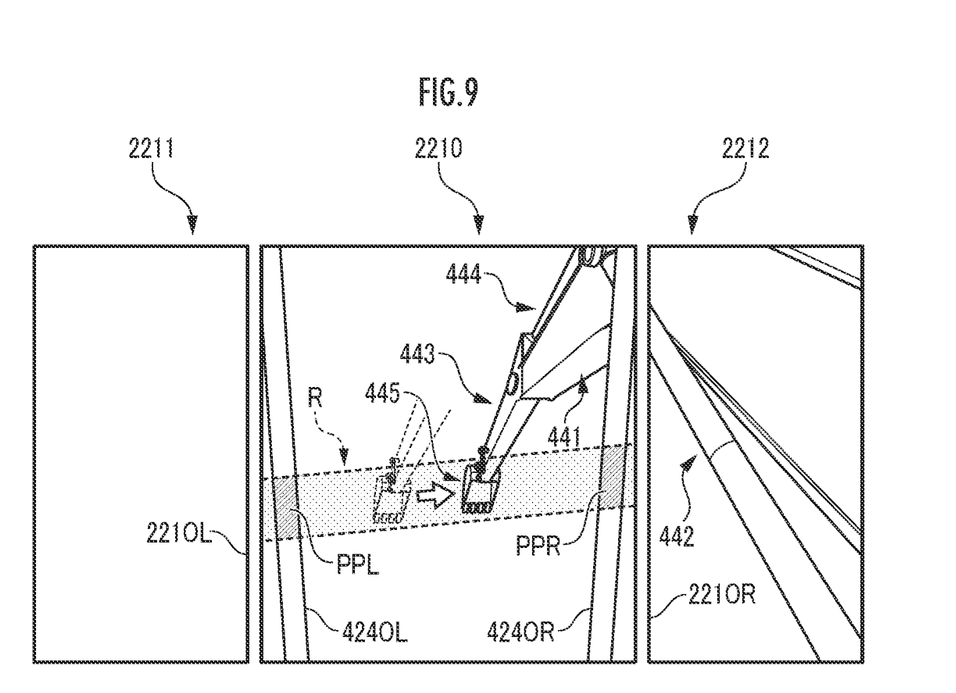
FIG. 9 is an explanatory drawing regarding a fifth display mode of the picked-up image.

Further, the remote controller 200 may define the image region that extends in a belt shape in a direction parallel to a displacement direction over the first specified period of the work unit (for example, the bucket 445) of the actuation mechanism (for example, the work attachment 440) configuring the work machine 40 as the specified image region R in the specified image output device (for example, the central image output device 2210). Thus, for example, as illustrated in FIG. 9, the image region that extends in a belt shape in the direction (here, diagonally right upward) parallel to the displacement direction (see a thick arrow) over the first specified period of the bucket 445 (work unit) is defined as the specified image region R in the central image output device 2210. Then, the display mode of the picked-up image in the central image output device 2210 is controlled so as to display all of the specified portion PPL of the left side pillar 4240L and the specified portion PPR of the right side pillar 4240R overlapping the specified image region R.

Further, the remote controller 200 may define the image region that extends in a belt shape in the direction parallel to the displacement direction ahead on the line of sight over the second specified period of the operator detected by the line-of-sight detector as the specified image region R in the specified image output device (for example, the central image output device 2210).

The remote controller 200 may variably control the display mode of the picked-up image in the central image output device 2210 (specified image output device) according to a difference of the operation mode by the operator in the remote operation mechanism 211.

According to the remote operation device 20 of the configuration, even when the situation in front of the cab 424 illustrated by the picked-up image is changed since the state of the work machine 40 is changed according to the operation of the remote operation mechanism 211 by the operator, the display mode of the picked-up image is variably controlled so as to include all of the specified portion PPL or PPR of the at least one pillar 4240L or 4240R in the specified image region R in the central image output device 2210 (specified image output device). Thus, the possibility of the operator mistaking or mixing up the pair of the pillars 4240L and 4240R of the cab 424 projected in the picked-up image which is changed according to the operation of the remote operation mechanism 211 with the bezels 2210L and 2210R of the central image output device 2210 where the pillars 4240L and 4240R are displayed is reduced.

Figure 3:
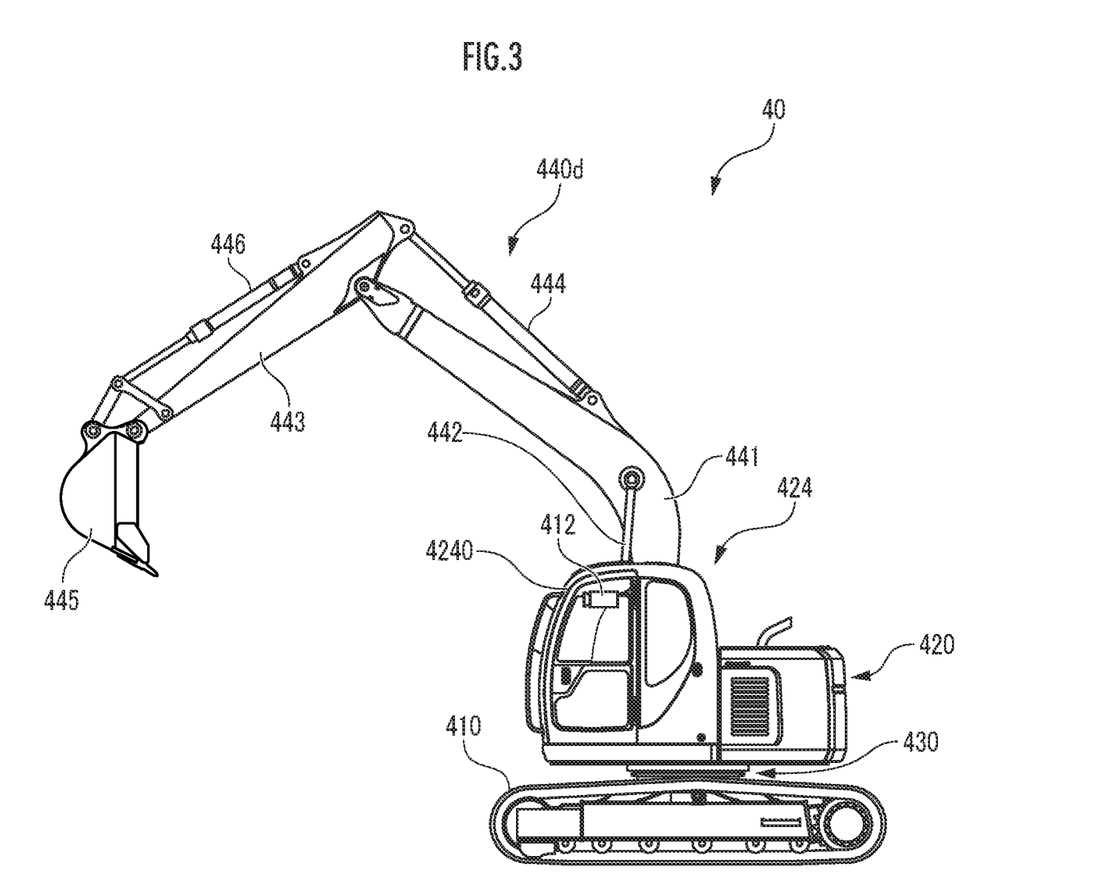
FIG. 3 is an explanatory drawing regarding a configuration of a work machine.

When there is a turning operation for turning the upper turning body 420 where the cab 424 is installed relative to the lower traveling body 410 in the remote operation mechanism 211 (see FIG. 3), the remote controller 200 may variably control the display mode of the picked-up image so that the central image output device 2210 (specified image output device) displays the specified portion PPL (or PPR) of one pillar 4240L (or 4240R) present in a turning direction of the upper turning body 420 of the pair of the left and right pillars 4240L and 4240R more emphatically than the specified portion PPR (or PPL) of the other pillar 4240R (or 4240L).

Figure 7:
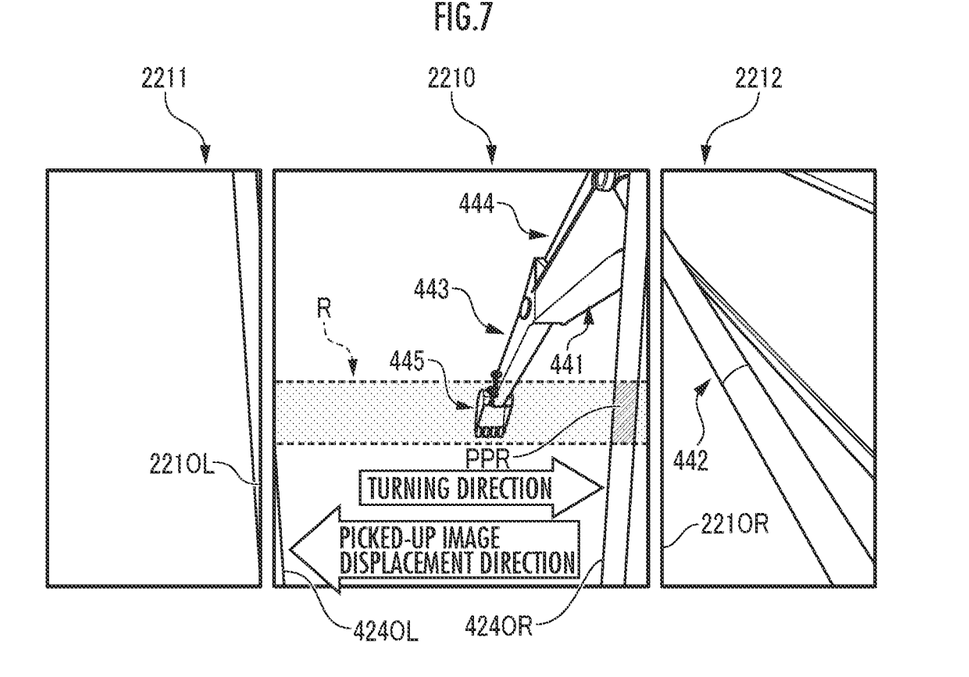
FIG. 7 is an explanatory drawing regarding a third display mode of the picked-up image.

According to the remote operation device 20 of the configuration, when the upper turning body 420 of the work machine 40 turns right relative to the lower traveling body 410 according to the turning operation of the remote operation mechanism 211 by the operator, as illustrated in FIG. 7, the situation in front of the cab 424 illustrated by the picked-up image is generally displaced in an opposite direction (see an arrow of the PICKED-UP IMAGE DISPLACEMENT DIRECTION) of the turning direction (see an arrow of the TURNING DIRECTION). In this case, as illustrated in FIG. 7, in the picked-up image displayed in the central image output device 2210, at least part of the specified portion PPL of the left side pillar 4240L is not displayed but all of the specified portion PPR of the right side pillar 4240R is displayed. Thus, in the picked-up image displayed in the central image output device 2210, an area of the right side pillar 4240R is larger than the area of the left side pillar 4240L. In FIG. 7, the specified image region R is defined according to the embodiment in FIG. 5, but may be defined according to the embodiment in FIG. 6 or the like.

Figure 8:
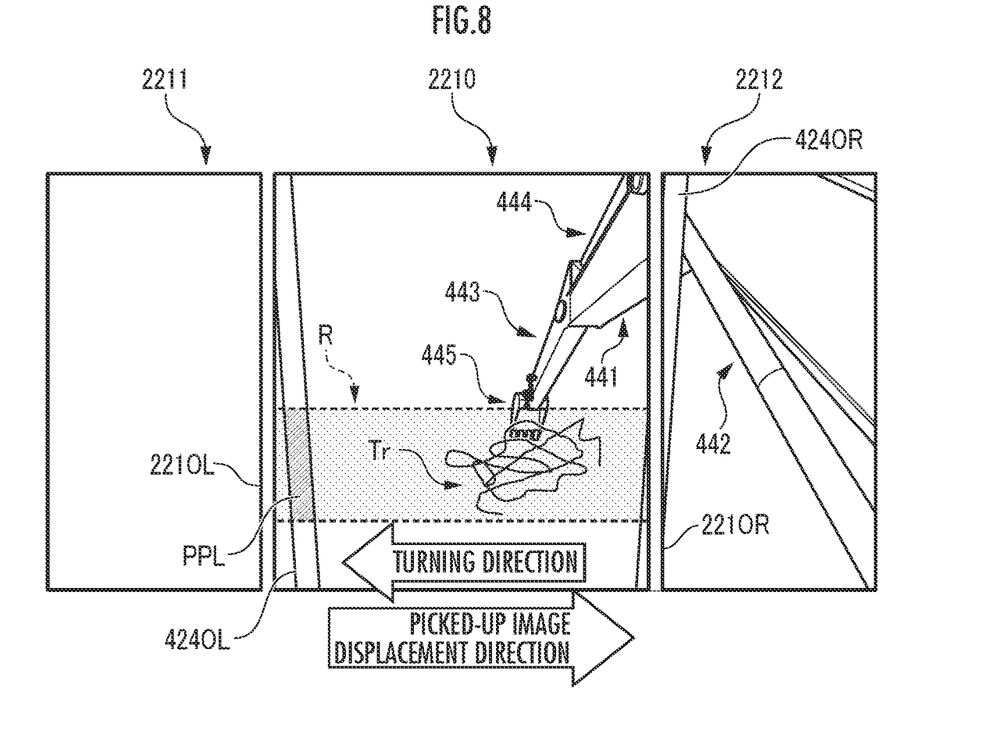
FIG. 8 is an explanatory drawing regarding a fourth display mode of the picked-up image.

Similarly, when the upper turning body 420 of the work machine 40 turns left relative to the lower traveling body 410 according to the turning operation of the remote operation mechanism 211 by the operator, as illustrated in FIG. 8, the situation in front of the cab 424 illustrated by the picked-up image is generally displaced in the opposite direction (see an arrow of the PICKED-UP IMAGE DISPLACEMENT DIRECTION) of the turning direction (see an arrow of the TURNING DIRECTION). In this case, as illustrated in FIG. 8, in the picked-up image displayed in the central image output device 2210, at least part of the specified portion PPR of the right side pillar 4240R is not displayed but all of the specified portion PPL of the left side pillar 4240L is displayed. Thus, in the picked-up image displayed in the central image output device 2210, the area of the left side pillar 4240L is larger than the area of the right side pillar 4240R. In FIG. 8, the specified image region R is defined according to the embodiment in FIG. 6, but may be defined according to the embodiment in FIG. 5 or the like.

As a result, the possibility of the operator mistaking or mixing up the one pillar 4240L or 4240R of the cab 424 projected in the turning direction according to the turning operation of the remote operation mechanism 211 with the bezel 2210L or 2210R of the central image output device 2210 where the pillar 4240L or 4240R is displayed is reduced. Since the line of sight or attention of the operator tends to be drawn to the right side of the central image output device 2210 when the upper turning body 420 turns right and the line of sight or the attention of the operator tends to be drawn to the left side of the central image output device 2210 when the upper turning body 420 turns left, control of the display mode is specially significant.

The remote controller 200 makes the right side image output device 2212, the central image output device 2210 and the left side image output device 2211 dividedly display the picked-up image, and variably controls the divided display mode of the picked-up image in the right side image output device 2212, the central image output device 2210 and the left side image output device 2211.

When the line of sight of the operator moves between the central image output device 2210 and the left side image output device 2211, the possibility of the operator mistaking or mixing up the left side bezel 2210L of the central image output device 2210 with the left side pillar 4240L configuring the operator's cab 424 is reduced. Similarly, when the line of sight of the operator moves between the central image output device 2210 and the right side image output device 2212, the possibility of the operator mistaking or mixing up the right side bezel 2210R of the central image output device 2210 with the right side pillar 4240R configuring the operator's cab 424 is reduced.

The remote controller 200 defines the image region that extends in a belt shape including the work unit 445 of the actuation mechanism 440 configuring the work machine 40 as the specified image region in the specified image output device (for example, the central image output device 2210), and variably controls the display mode of the picked-up image in the specified image output device so as to display all of the specified portion of the at least one pillar 4240L or 4240R.

Since the possibility of the operator mistaking or mixing up the pair of the pillars 4240L and 4240R of the operator's cab 424 projected in the picked-up image with the bezels 2210L and 2210R of the specified image output device where the pillars are displayed is reduced so as to enable the spatial recognition including the recognition of the position, the direction, the posture, the size, the shape and the interval from the work object or the like of the work unit 445 in the real space with the specified portion of the at least one pillar 4240L or 4240R projected in the picked-up image and the work unit 445 of the actuation mechanism 440 configuring the work machine 40 respectively as indexes, the spatial recognition accuracy by the operator is improved.

The remote controller 200 defines the image region that extends in a belt shape including part or all of the position track over the first specified period of the work unit as the specified image region in the specified image output device (for example, the central image output device 2210), and variably controls the display mode of the picked-up image in the specified image output device so as to display all of the specified portion of the at least one pillar 4240L or 4240R.

The remote controller 200 defines the image region that extends in a belt shape in the direction parallel to the displacement direction over the first specified period of the work unit 445 as the specified image region in the specified image output device (for example, the central image output device 2210), and variably controls the display mode of the picked-up image in the specified image output device so as to display all of the specified portion of the at least one pillar 4240L or 4240R.

The remote operation device 20 further comprises the line-of-sight detector which detects the line of sight of the operator, and the remote controller 200 defines the image region that extends in a belt shape including part or all of the track ahead on the line of sight over the second specified period of the operator detected by the line-of-sight detector as the specified image region in the specified image output device (for example, the central image output device 2210), and variably controls the display mode of the picked-up image in the specified image output device so as to display all of the specified portion of the at least one pillar 4240L or 4240R.

With the specified portion of the at least one pillar 4240L or 4240R projected in the picked-up image and the object or the like present ahead on the line of sight of the operator as indexes or marks, the spatial recognition including the recognition of the position, the direction, the posture, the size, the shape and the interval from the work object or the like of the work unit 445 in the real space is made possible. Since the possibility of the operator mistaking or mixing up the pair of the pillars 4240L and 4240R of the operator's cab 424 projected in the picked-up image with the bezels 2210L and 2210R of the image output device where the pillar is displayed is reduced as described above, the spatial recognition accuracy by the operator is improved.

The remote controller 200 defines the image region that extends in a belt shape in the direction parallel to the displacement direction ahead on the line of sight over the second specified period of the operator detected by the line-of-sight detector as the specified image region in the specified image output device (for example, the central image output device 2210), and variably controls the display mode of the picked-up image in the specified image output device so as to display all of the specified portion of the at least one pillar 4240L or 4240R.

The remote controller 200 variably controls the display mode of the picked-up image in the specified image output device according to the difference of the operation mode by the operator in the remote operation mechanism.

Even when the situation in front of the operator's cab 424 illustrated by the picked-up image is changed since the operation state of the work machine 40 is changed according to the operation of the remote operation mechanism 211 by the operator, the display mode of the picked-up image is variably controlled so as to include all of the specified portion of the at least one pillar in the specified image region in the specified image output device. Thus, the possibility of the operator mistaking or mixing up the pair of the pillars 4240L and 4240R of the operator's cab 424 projected in the picked-up image which is changed according to the operation of the remote operation mechanism with the bezels 2210L and 2210R of the image output device where the pillars are displayed is reduced.

When there is the turning operation for turning the upper turning body 420 where the operator's cab 424 is installed relative to the lower traveling body 410 in the remote operation mechanism 211, the remote controller 200 variably controls the display mode of the picked-up image in the specified image output device so that the specified image output device (for example, the central image output device 2210) displays one pillar present in the turning direction of the upper turning body 41 of the pair of the left and right pillars 4240L and 4240R more emphatically than the other pillar.

When the situation in front of the operator's cab 424 illustrated by the picked-up image is generally displaced in the opposite direction of the turning direction by turning of the upper turning body 420 of the work machine 40 relative to the lower traveling body 410 according to the turning operation of the remote operation mechanism 211 by the operator, the one pillar 4240L (4240R) present in the turning direction is displayed more emphatically than the other pillar 4240R (4240L) in the specified image region in the specified image output device (for example, the central image output device 2210). Thus, for example, in the picked-up image displayed in the specified image output device, at least part of the specified portion of the other pillar 4240R (4240L) is not displayed but all of the specified portion of the one pillar 4240L (4240R) is displayed. In addition, the display mode of the picked-up image in the specified image output device may be controlled such that the area (the number of pixels configuring the image region corresponding to the one pillar) of the one pillar 4240L (4240R) in the specified image output device becomes larger than the area (the number of pixels configuring the image region corresponding to the other pillar) of the other pillar 4240R (4240L). As a result, the possibility of the operator mistaking or mixing up the one pillar 4240L (4240R) of the operator's cab 424 projected in the turning direction according to the turning operation of the remote operation mechanism 211 with the bezel 2210L (2210R) of the image output device where the pillar is displayed is reduced.

REFERENCE SIGNS LIST

10 . . . remote operation assistance server, 20 . . . remote operation device, 40 . . . work machine, 41 . . . real machine input interface, 42 . . . real machine output interface, 102 . . . database, 121 . . . first assistance processing element, 122 . . . second assistance processing element, 200 . . . remote controller, 210 . . . remote input interface, 211 . . . remote operation mechanism, 220 . . . remote output interface, 221 . . . image output device, 400 . . . real machine controller, 410 . . . lower traveling body, 420 . . . upper turning body, 424 . . . cab (operator's cab), 440 . . . work attachment (actuation mechanism), 445 . . . bucket (work unit), 2210 . . . central image output device (specified image output device), 2211 . . . left side image output device, 2212 . . . right side image output device, 4240L . . . left side pillar, 4240R . . . right side pillar, PPL, PPR . . . specified portions of pillars.

The invention claimed is:

1. A remote operation device to remotely operate a work machine, the work machine including an operator's cab, a pair of right and left pillars at a front side of the operator's cab configuring the operator's cab, a real machine image pickup device installed inside the operator's cab and which acquires picked-up image indicating a situation in front of the operator's cab, and a controller configured by a processor which executes a processing to transmit picked-up image data of the picked-up image acquired by the image pickup device to the remote operation device, the remote operation device comprising:
- one or more image output devices which is able to output image data; and
- a remote controller configured by a processor which executes a processing to control image output of the image output by the image output device defined as a specified image output device among the one or more image output devices,
- wherein in a case where the picked-up image data of the picked-up image acquired by the image pickup device is received by the remote operation device, the remote controller makes the specified image output device display the picked-up image indicating the situation in front of the operator's cab according to the picked-up image date, and variably controls the image output of the picked-up image in the specified image output device so as to display all of a specified portion, which is part of at least one of the pair of pillars captured in the picked-up image, overlapping a specified image region which is a region that extends in a belt shape between left and right bezels which are a part of a frame of in the specified image output device in the picked-up image displayed in the specified image output device.

2. The remote operation device according to claim 1, comprising
- a central image output device as the specified image output device arranged in front of the remote operation mechanism and a left side image output device and a right side image output device arranged respectively at diagonally left front and diagonally right front of the remote operation mechanism adjacently to left and right side edges of the central image output device respectively, as the plurality of image output devices,
- wherein the remote controller makes the right side image output device, the central image output device and the left side image output device dividedly display the picked-up image showing the situation in front of the operator's cab according to the picked-up image data, and variably controls an output of the divided image of the picked-up image in the right side image output device, the central image output device and the left side image output device.

3. The remote operation device according to claim 1, wherein
- the work machine includes a work unit at a tip end and includes an actuation mechanism provided at front of the work machine,
- the real machine image pickup device images the picked-up image in which the work unit is captured, and
- the remote controller defines an image region that extends in a belt shape including the work unit captured in the picked-up image and displayed in the specified image output device as the specified image region, and variably controls the image output of the picked-up image in the specified image output device so as to display all of the specified portion of the at least one pillar.

4. The remote operation device according to claim 3, wherein the remote controller defines an image region that extends in a belt shape including part or all of a position track over a first specified period of the work unit captured in the picked-up image and displayed in the specified image output device as the specified image region and variably controls the image output of the picked-up image in the specified image output device so as to display all of the specified portion of the at least one pillar.

5. The remote operation device according to claim 4, wherein the remote controller defines an image region that extends in a belt shape in a direction parallel to a displacement direction over the first specified period of the work unit captured in the picked-up image and displayed in the specified image output device as the specified image region and variably controls the image output of the picked-up image in the specified image output device so as to display all of the specified portion of the at least one pillar.

6. The remote operation device according to claim 1, further comprising
- a line-of-sight detector configured to detect a line of sight of the operator remotely operating the work machine through the remote operation device,
- wherein the remote controller defines an image region that extends in a belt shape including part or all of a track ahead on the line of sight over a second specified period of the operator detected by the line-of-sight detector as the specified image region in the specified image output device, and variably controls the image output of the picked-up image in the specified image output device so as to display all of the specified portion of the at least one pillar.

7. The remote operation device according to claim 6, wherein the remote controller defines an image region that extends in a belt shape in a direction parallel to a displacement direction ahead on the line of sight over the second specified period of the operator detected by the line-of-sight detector as the specified image region in the specified image output device, and variably controls the image output of the picked-up image in the specified image output device so as to display all of the specified portion of the at least one pillar.

8. The remote operation device according to claim 1, wherein
- the remote operation device comprises a remote operation mechanism which receives an operation for remotely operating the work machine by the operator, and
- the remote controller variably controls the image output of the picked-up image in the specified image output device according to a change of an operation mode by the operator in the remote operation mechanism.

9. The remote operation device according to claim 8, wherein, when there is a turning operation for turning an upper turning body where the operator's cab is installed relative to a lower traveling body in the remote operation mechanism, the remote controller variably controls the image output of the picked-up image in the specified image output device so that the specified image output device displays one pillar in a turning direction of the upper turning body of the pair of left and right pillars more emphatically than the other pillar.

10. A remote operation assistance server for assisting a remote operation of a work machine through a remote operation device, the work machine including an operator's cab, a pair of right and left pillars at a front side of the operator's cab configuring the operator's cab, a real machine image pickup device installed inside the operator's cab and which acquires picked-up image indicating a situation in front of the operator's cab, and a controller configured by a processor which executes a processing to transmit picked-up image data of the picked-up image acquired by the image pickup device to the remote operation assist server, the remote operation device including, one or more image output devices which is able to output image, and a remote controller configured by a processor which executes a processing to control image output of the image output by the image output device defined as a specified image output device among the one or more image output devices, the remote operation assist server comprising:

a first assistance processing element configured to acquire by receiving the picked-up image data transmitted to the remote operation assist server from the work machine; and a second assistance processing element configured to make the specified image output device display the picked-up image indicating the situation in front of the operator's cab according to the picked-up image data by transmitting the received picked-up image data to the remote operation device, and to transmit to the remote operation device a command to variably control a image output of the picked-up image in the specified image output device so as to display all of a specified portion, which is part of at least one of the pair of pillars captured in the picked-up image, overlapping a specified image region which is a region that extends in a belt shape between left and right bezels which is a part of a frame of in the specified image output device in the picked-up image displayed in the specified image output device, based on communication with the remote operation device.

11. A remote operation assistance system configured by a work machine, a remote operation device to remotely operate a work machine, and a remote operation assist server having a function to mutually communicate with each of the work machine and the remote operation device:

the work machine comprising;
an operator's cab,
a pair of right and left pillars at a front side of the operator's cab configuring the operator's cab,
a real machine image pickup device installed inside the operator's cab and which acquires picked-up image indicating a situation in front of the operator's cab, and
a real machine controller configured by a processor which executes a processing to transmit picked-up image data of the picked-up image acquired by the image pickup device to the remote operation assist server, the remote operation device comprising;
one or more image output devices which is able to output image, and
a remote controller configured by a processor which executes a processing to control image output of the image output by the image output device defined as a specified image output device among the one or more image output devices, wherein the remote operation assist server is configured to, in a case where the picked-up image data transmitted from the work machine is received, transmits the received pick-up image data to the remote operation device, and in the case where the picked-up image data is received by the remote operation device, the remote controller makes the specified image output device display the picked-up image indicating the situation in front of the operator's cab according to the picked-up image data, and variably controls the image output of the picked-up image in the specified image output device so as to display all of a specified portion, which is part of at least one of the pair of pillars captured in the picked-up image, overlapping a specified image region which is a region that extends in a belt shape between left and right bezels which is a part of a frame of the specified image output device in the picked-up image displayed in the specified image output device.

12. A remote operation method for assisting a remote operation of a work machine through a remote operation device, the work machine including an operator's cab, a pair of right and left pillars at a front side of the operator's cab configuring the operator's cab, a real machine image pickup device installed inside the operator's cab and which acquires picked-up image indicating a situation in front of the operator's cab, and a real machine controller configured by a processor which executes a processing to transmit picked-up image data of the picked-up image acquired by the image pickup device to the remote operation device, the remote operation device including one or more image output devices which is able to output image, and a remote controller configured by a processor which executes a processing to control image output of the image output by the image output device defined as a specified image output device among the one or more image output devices, the method being a process executed by the remote controller and includes a processing wherein, in a case where the picked-up image data is received by the remote operation device, the remote controller makes the specified image output device display the picked-up image indicating the situation in front of the operator's cab according to the picked-up image data, and variably controls the image output of the picked-up image in the specified image output device so as to display all of a specified portion, which is part of at least one of the pair of pillars captured in the picked-up image, overlapping a specified image region which is a region that extends in a belt shape between left and right bezels which is a part of a frame of the specified image output device in the picked-up image displayed in the specified image output device.

\* \* \* \* \*